UNITED STATES PATENT OFFICE.

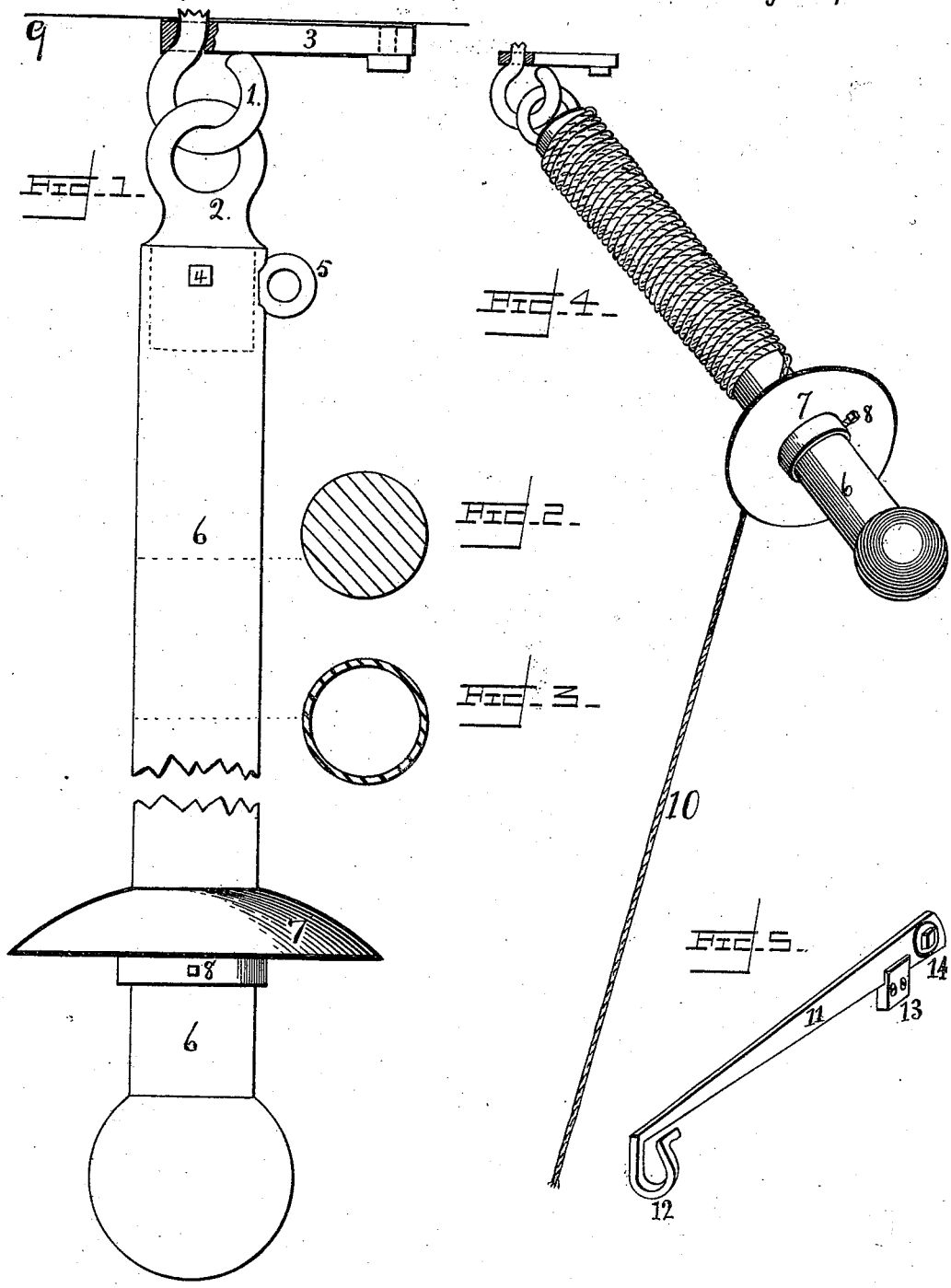

SAM DOUGLAS SILVER, OF SEATTLE, WASHINGTON.

FIRE-ESCAPE.

SPECIFICATION forming part of Letters Patent No. 501,373, dated July 11, 1893.

Application filed March 18, 1893. Serial No. 466,727. (No model.)

*To all whom it may concern:*

Be it known that I, SAM DOUGLAS SILVER, a citizen of the United States, residing at Seattle, in the county of King and State of Washington, have invented certain new and useful Improvements in Fire-Escapes; and I do hereby declare the following to be a full, clear, and exact description of the invention, such as will enable others skilled in the art to which it appertains to make and use the same.

My invention relates to a mechanical device new in every particular for use as a fire escape and for safely governing the speed of paying or uncoiling a line for any other purpose.

The objects of my invention, are, first, to provide a positively automatic fire escape that will enable any person skilled or otherwise, large or small, heavy or light, to reach the ground safely from any point of a building; second, to provide an automatic governor for paying out line, cord or rope, when carrying a load.

The invention therefore consists in the construction, arrangement and combination of parts, substantially as will be hereinafter described and claimed.

In the accompanying drawings illustrating my invention: Figure 1 represents the governor attached to the wall, or ceiling, by hook; Fig. 2 a section of governor if made of solid material; Fig. 3 a section of governor if made of tubing; Fig. 4 a complete fire escape attached to ceiling or wall as in use; Fig. 5 a bracket to carry a line out a safe distance from wall of building outside or otherwise.

Similar numerals refer to similar parts throughout the several figures.

The hook 1 is attached to the ceiling, wall or floor line 9, one or more in each room in building above ground floor, having outside windows or doors. This hook is fixed and must not turn when in use. The eye 2 is fixed to governor 6 by bolt 4, or by spring snap and plays on hook 1. The bearing parts of 1 and 2 are made of best half inch or larger, round iron or steel, or equally strong materials. The movable button 3 closes the hook when eye is in place, to prevent a possibility of the eye jumping out of the hook when in use. In case the governor 6 were made of solid material as of wood or otherwise, the hook 1 would be used as shown and the eye 2 would be riveted to the governor, but if the governor 6 were made of hollow tubing, an eye would take the place of the hook 1, and the two eyes 1 and 2 would be made together, and eye 2 would be made to insert in the end of governor as shown by dotted lines. This arrangement enables me to quickly move a governor 6, from which the line has been used, and replace it with another ready for use without delay. The line 10 is secured to governor 6, at the eye 5, and closely wound around it (the governor) until the required length for the rooms or story of the building it is intended for, is in place, when the movable flange 7 is secured to governor 6, where the rope or line leaves the governor 6, by set screw 8. The governor 6 is of the size required to carry a sufficient quantity of line, but will depend on its weight to govern the speed at which it will pay out the line. The diameter of the governor 6 is, from one and one quarter inch to three inches, and the length of the same is from sixteen to thirty-six inches, or longer. The movable flange 7 is only in contact with the line when the weight first throws the governor into action and is to prevent the line from whipping or slipping off too rapidly before the inertia of the governor 6 is overcome. The line 10 may be of metals, cotton, silk, hemp, or other material and its size will depend upon its material and strength, that it may of certainty carry its load. The solid metal bracket 11 is designed to swing on bolt and washer 14, by which it is secured to the window frame, outside the sash, and is designed to carry the line through the eye 12, at a distance from the wall of the building, that would prevent injury to person descending. This bracket when not in use is folded up against the sash and when in use is swung out and supported by cleat 13, and its outer end inclined downward, to prevent those descending from higher rooms, lodging on it. The open eye 12 has its end turned under the arms of bracket 11, for the same reason.

The fire escape when in place in a room ready for use, has a belt secured to end of line, by which the line is made fast to person. The governor 6 may be secured to wall rigidly by mechanism (not shown and on which no patent is asked) that is controlled by person about to descend, which enables the person descending, to suspend himself or herself, with the line taut, before freeing the governor. The person desiring to descend by the fire escape, fastens belt about the body (the line having been previously adjusted for length), hoists window, swings bracket 11 into position, places line in eye 12 and by holding to bracket 11, swings out and lets go, which brings line taut, after which the governor is freed by a pull on cord attached to belt. The instant the governor 6 is freed, it assumes a rotary swinging motion and with each revolution or rotary swing of the governor, one coil of line and no more is paid out, until body reaches ground, when line slacks and governor comes to rest. Every room above ground floor would be provided with one or more stationary attachments 1 and 2 and with a governor ready for use, with line and belt in each room for every person liable to be in said room at any time and extra governors for baggage or other valuables. If fire prevents use in one room of building, take the governor to another room. A knuckle-joint may be substituted for eyes and hooks 1 and 2. The line referred to as a part of the fire escape, may be wound or coiled around the governor as specified, and then a second wrap of the line over the first, from the flange up to any desired point, and the same process may be continued, covering the governor or any part of it with as many thicknesses of line as desired. The flange may be omitted, or it may be larger or smaller than the proportions shown in the drawings. The attachments for securing the governor to the wall may be used without bracket securing the same to the wall but may be suspended by braces and supports at a distance from the wall or in front of the window, door or other opening. The governor regulates the speed at which the line is paid out and depends on its size, length and weight for proper action.

Numerous changes may be made in the exact construction, and arrangement of the several parts of my improved fire escape, or device for lowering objects, without departing from the invention.

What I have herein presented and described is simply by way of example, and I do not wish to be restricted to any particular form, shape and combination of parts. Also it is to be perceived that I intend using the device for numerous different purposes. Its use as a fire escape will undoubtedly be a pre-eminent and leading one but it can also be successfully applied for lowering any kind of object, or for paying out or uncoiling a line for any desired purpose.

Having thus described my invention, what I claim as new, and desire to secure by Letters Patent, is—

1. A device for lowering objects, consisting of a shaft, suspended movably at one end so that it may swing laterally around an axis, other than its own and a line wound upon the shaft to which the object is attached, substantially in line with the axis of revolution of the latter.

2. A device for lowering objects, consisting of a suspended shaft adapted to swing around an axis, a flange on said shaft and a line wound on the shaft and depending therefrom over the flange.

3. A device for lowering objects, consisting of a movably suspended depending shaft adapted to swing laterally around an axis, an adjustable flange on said shaft, and a line wound on the shaft and depending therefrom over the flange, to which line the object is attached, substantially in line with the axis of revolution of the shaft.

4. In a fire escape or device for lowering objects, the combination with a movably suspended governor shaft, adapted to swing around an axis and provided with a lateral projection, of a line wound on said shaft and depending therefrom over the projection, substantially as described.

5. In a fire escape or device for lowering objects, the combination with a governor shaft which is movably suspended and adapted to swing around an axis, of an encircling circular plate or flange on said shaft, and a line wound about the shaft and depending therefrom over the flange, substantially as described.

6. In a fire escape or device for lowering objects, the combination of the supporting bracket, a depending governor shaft, movably connected thereto at one end and having a flange thereon, and a line wound about the shaft and depending therefrom over the flange, to which line the object to be lowered, is attached, substantially as described.

SAM DOUGLAS SILVER.

Witnesses:
C. E. STURGIS,
WM. S. SILVER.